(12) United States Patent
Clifford et al.

(10) Patent No.: US 6,527,226 B1
(45) Date of Patent: Mar. 4, 2003

(54) FLIGHT DECK HANDLING SYSTEM FOR LANDED AIRCRAFT

(75) Inventors: Matthew V. Clifford, Crownsville, MD (US); Ralph E. Williams, Vienna, VA (US); Andrew R. Bush, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/073,596

(22) Filed: Feb. 8, 2002

(51) Int. Cl.[7] .................................................. B64D 3/00
(52) U.S. Cl. ................ 244/115; 244/17.17; 244/110 E; 244/116; 244/50
(58) Field of Search ........................ 244/17.17, 110 F, 244/110 E, 115, 116, 114 R, 50; 180/904, 14.1, 14.7

(56) References Cited

U.S. PATENT DOCUMENTS

| | | | | |
|---|---|---|---|---|
| 3,049,253 A | * | 8/1962 | Cabral | 244/50 |
| 4,223,856 A | * | 9/1980 | Divincenzo | 244/50 |
| 4,488,612 A | * | 12/1984 | Patterson | 244/50 |
| 4,600,168 A | * | 7/1986 | Selecman | 244/50 |
| 5,151,004 A | * | 9/1992 | Johnson | 244/50 |
| 5,259,574 A | | 11/1993 | Carrot | |
| 5,560,568 A | * | 10/1996 | Schmittle | 244/110 E |
| 5,992,794 A | | 11/1999 | Rotman et al. | |

* cited by examiner

Primary Examiner—Galen L. Barefoot
(74) Attorney, Agent, or Firm—Jack Shuster

(57) ABSTRACT

A remotely controlled movably powered shuttle frame has foundation pads attached thereto at all four corner portions for separating skid pads of a helicopter from the flight deck of a marine vessel, wherein both the skid pads and the fight deck are outfitted with hook and loop fabrics. Skid blades displaced from retracted positions underlying the foundation pads are extended from the shuttle frame underlying a landed aircraft whose weight has been lifted off the flight deck by lifting arms pivotally mounted on the foundation pads. The aircraft carried by the lifting arms on the shuttle frame after the skid blades are retracted is shuttled by wheeled movement of the shuttle frame to a desired location on the flight deck.

8 Claims, 4 Drawing Sheets

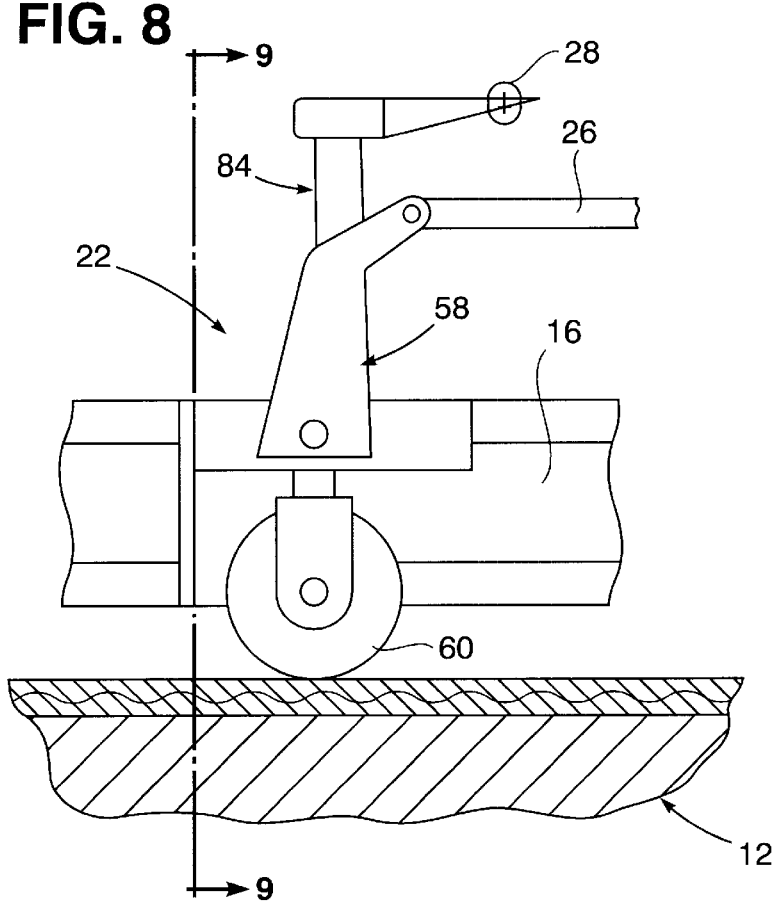
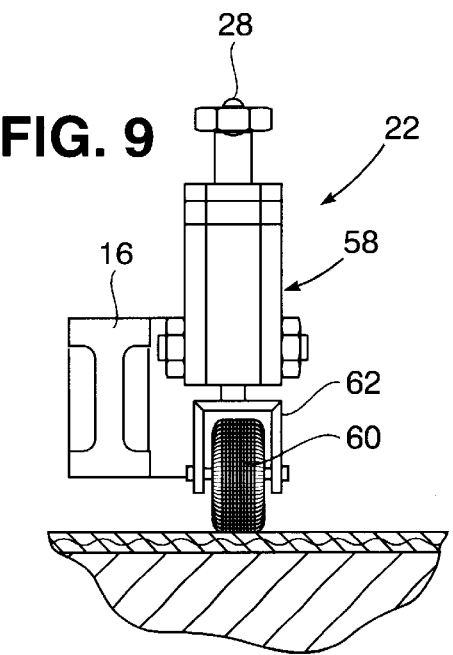

FLIGHT DECK HANDLING SYSTEM FOR LANDED AIRCRAFT

STATEMENT OF GOVERNMENT INTEREST

The invention described herein may be manufactured and used by or for the Government of the United States of America for governmental purposes without the payment of any royalties thereon or therefore.

The present invention relates generally to handling of aircraft such as helicopters after landing on the flight deck of a marine vessel.

BACKGROUND OF THE INVENTION

Currently there are two basic handling systems associated with the landing and launching of helicopters on small deck ships. The RAST system in use by the U.S. Navy involves under deck machinery for shuttling of helicopters between deck hangar and flight area. The Harpoon system in use on NATO ships involves a spear-like device hanging from a helicopter that is thrust into a deck-mounted grid for securing the helicopter on the deck, and requiring a separate winch system for maneuvering the helicopter on the deck. Both systems add weight and cost to the ship and the helicopter. It is therefore an important object of the present invention to address deck handling needs for helicopters at reduced cost and weight.

SUMMARY OF THE INVENTION

In accordance with the present invention, a supporting shuttle is provided with retractable wheels that are driven and steered to move the shuttle on the flight deck of a marine vessel under a helicopter so as to pick up the helicopter following its landing on the flight deck for support on the shuttle to be maneuvered thereafter. According to the embodiment disclosed in this application, a "hook" fabric on the underside of the helicopter skid pads engages "loop" fabric attached to the ship's deck. Such action secures the helicopter to the deck and it is thereafter separated from the deck for maneuver on the shuttle.

Transfer of a landed aircraft to the frame of the shuttle after retraction of the wheels is effected by means of power-driven lifting arms engaging lift lugs on the undercarriage of the helicopter to relieve weight from its landing skid pads. Slide blades are then extended from skid separator units on the shuttle into underlying relation to the helicopter skid pads so as to separate the hook and loop fabrics for release of the helicopter from the deck. The shuttle wheels are then lowered from the shuttle frame and the blades retracted into the skid separator units so as to accommodate shuttling and maneuvering of the helicopter.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 8 is a partial side section view, showing one of the shuttle wheel assemblies of the shuttle in an extended position for wheel support on the flight deck; and FIG. 9 is a partial section view taken substantially through a plane indicated by section line 9—9 in FIG. 8.

DETAILED DESCRIPTION OF PREFERRED EMBODIMENT

Figure 1:
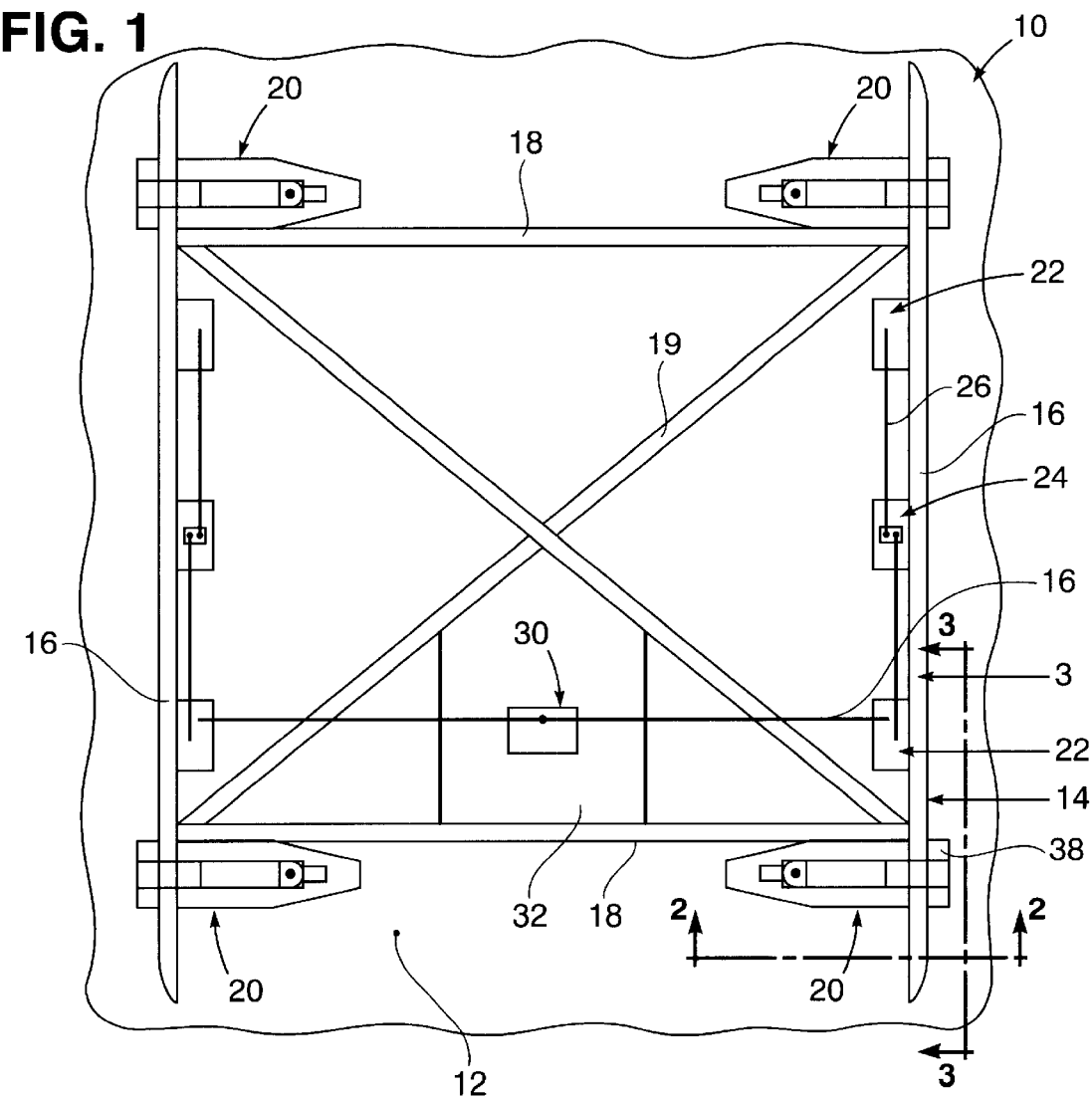
FIG. 1 is a somewhat schematic top plan view of an aircraft handling shuttle on a flight deck, in accordance with one embodiment of the present invention.

Referring now to the drawing in detail, FIG. 1 schematically depicts a generally rectangular aircraft handling shuttle 10 positioned on a flight deck 12 of a marine vessel. Such shuttle 10 includes a rigid supporting shuttle frame 14 formed by a pair of parallel spaced beams 16 interconnected by transverse beams 18, with cross-beams 19 interconnecting the beams 18 adjacent their attachments to the beams 16. At each of the four corners of the shuttle frame 14, where the beams 16 extend beyond the transverse beams 18, a skid separator unit 20 is attached. Two pair of retractable dolly shuttle wheel assemblies 22 are also respectively mounted on the inside of each of the beams 16 under control of a retraction mechanism 24 through links 26. Those of the wheel assemblies 22 closer to one end of the beams 16 are interconnected by a tiller bar 28 to a powering device 30 for steerage control of movement imparted through the wheel assemblies 22 to the shuttle frame 14 under remote control. The powering device 30 is mounted on a hydraulic power unit platform 32.

Figure 2:
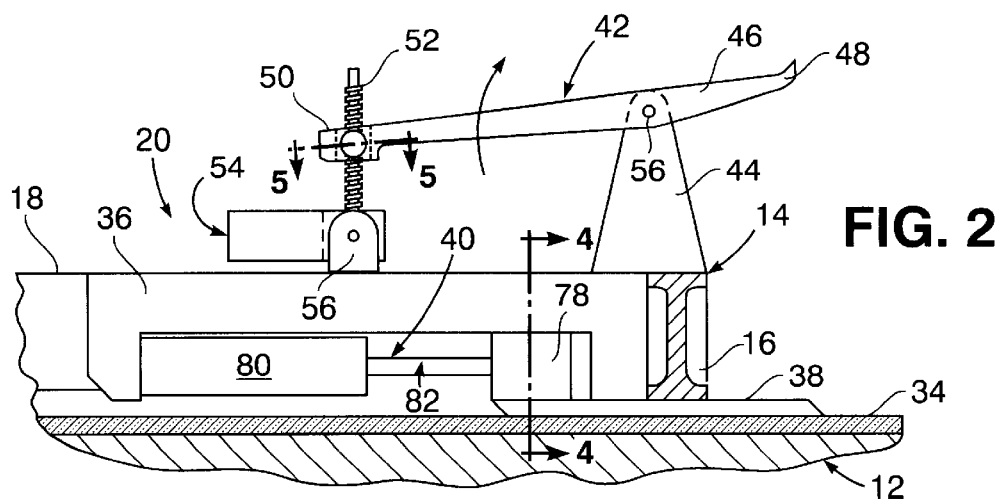
FIG. 2 is an enlarged partial section view taken substantially through a plane indicated by section line 2—2 in FIG. 1.
Figure 4:
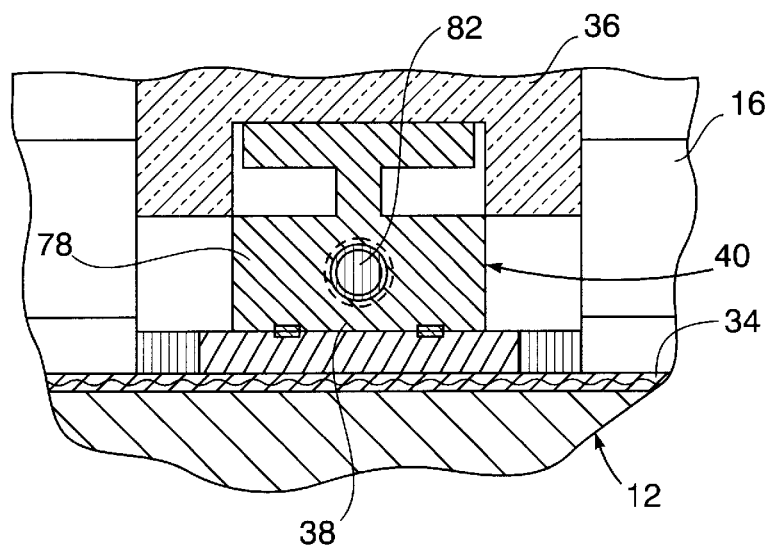
FIG. 4 is an enlarged partial section view taken substantially through a plane indicated by section line 4—4 in FIG. 2.

Referring now to FIGS. 2 and 4, shown in greater detail is one of the skid separator units 20 on the shuttle frame 14, which includes a foundation pad 36 attached to the frame 14 and a separator blade 38 slidably within a notch in the beam 16.

Also mounted on top of the foundation pad 36 is a lifting mechanism 42, shown in a raised position in FIG. 2. The lifting mechanism 42 includes a pedestal 44, secured to the top of the foundation pad 36 and the beam 14, to pivotally support a lifting arm 46 having a forward end portion 48 and a rear end portion 50 through which a jack-screw 52 extends. The jack-screw 52 is rotated about its axis by a hydraulic motor 54 which is pivotally mounted on top of the foundation pad 36 by a bracket 56. Rotation of the jack-screw 52 by the motor 54 causes angular displacement of the lifting arm 46 about its pivot 56 on the pedestal 44 from its raised position shown in FIG. 2 to a lowered position shown in FIG. 7 as hereinafter explained.

Figure 3:
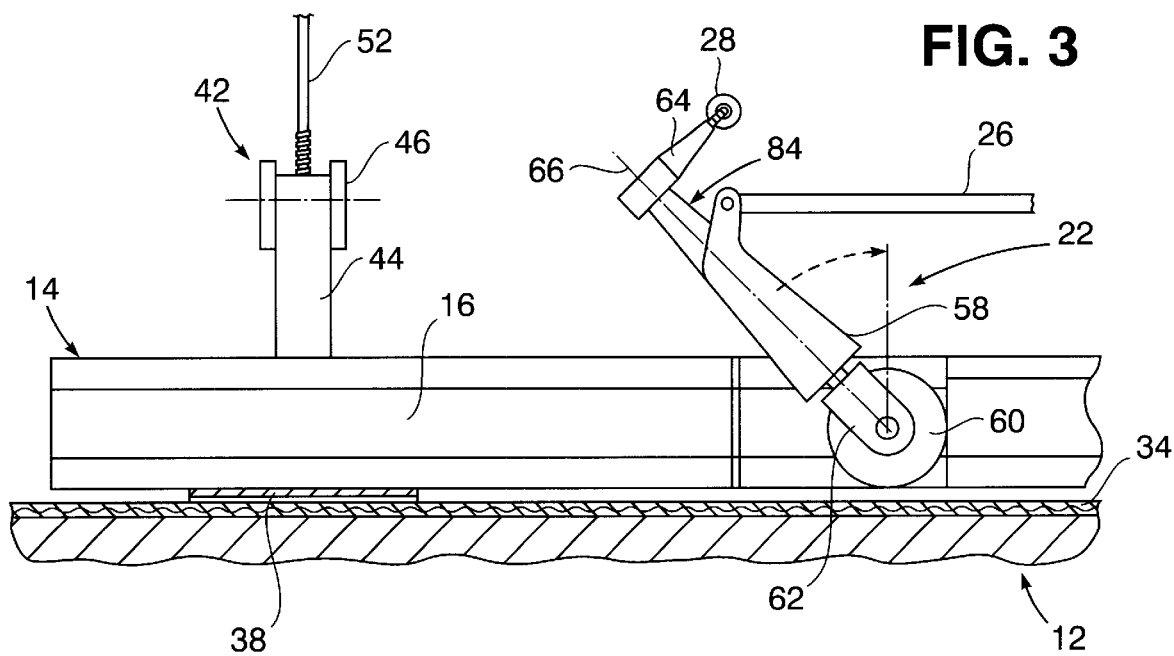
FIG. 3 is an enlarged partial section view taken substantially through a plane indicated by section line 3—3 in FIG. 1.

Referring now to FIG. 3, the shuttle frame 14 is shown resting on the flight deck 12 with the dolly shuttle wheel assemblies 22 in their retracted position and the separator blades 38 extended from the beams 16. Each of the wheel assemblies 22 includes a trunion 58 pivotally mounted on the frame beam 16 for angular displacement of a wheel 60 carried thereon by means of an axle support 62 attached to the trunion 58. Toward that end, the trunion 58 is connected at its upper angled end portion to the link 26 through which the wheel assembly 22 may be angularly displaced from the retracted position shown in FIG. 3 to an extended position as shown in FIG. 8 by means of the actuating mechanism 24, in order to shuttle or transport the shuttle frame 14 to another location as hereinafter explained. Also projecting from the trunion 58 above its pivotal connection to the elevating link 26 is a king pin 84 extending through the trunion 58 and attached to the axle support 62. A tiller 64 to which the tiller bar 28 is attached imparts angular displacement to the king pin 84 about the steering axis 66 under steering control by the powering device 30 as hereinbefore referred to in connection with FIG. 1.

Figure 5:
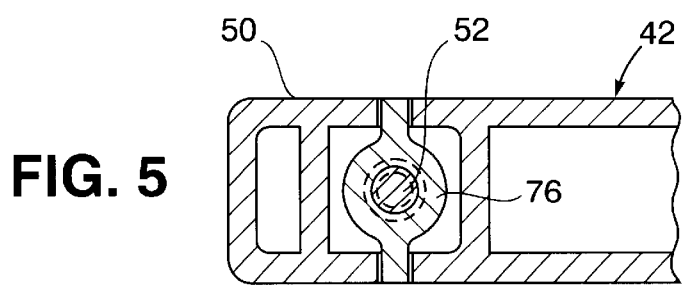
FIG. 5 is an enlarged partial section view taken substantially through a plane indicated by section line 5—5 in FIG. 2.
Figure 6:
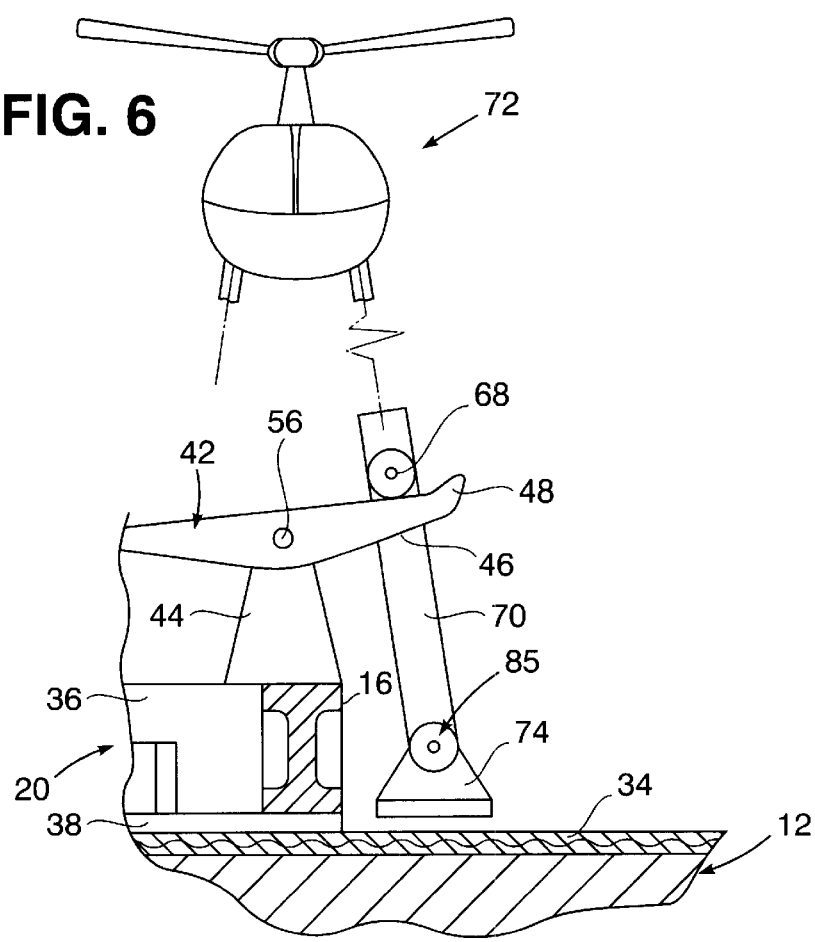
FIG. 6 is a side section view corresponding to a portion of FIG. 2, showing the shuttle loaded by an aircraft.
Figure 7:
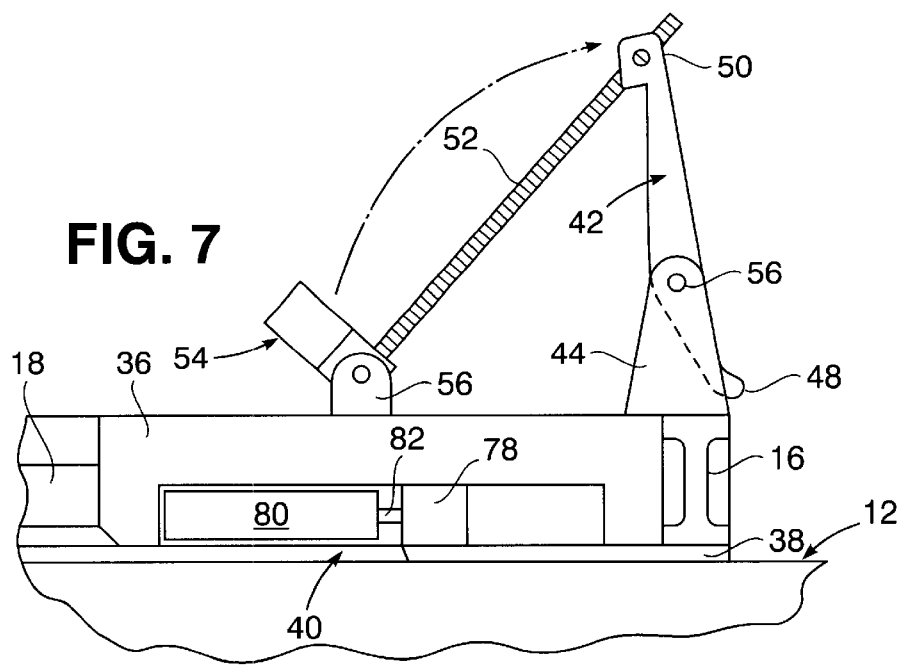
FIG. 7 is a side view corresponding to that of FIG. 6, showing the shuttle in an unloaded and retracted position.

Referring now to FIG. 6, the forward end portion 48 of the lifting arm 42 of the skid separator unit 20 in its raised position, is shown in underlying engagement with a lift lug 68 on an undercarriage strut 70 extending from a helicopter 72 thereabove. The helicopter skid pad 74 pivotally connected to a landing skid 85 is thereby held by the end portion of the lifting arm 48 above the deck 12. The skid pad 74 of the helicopter 72 may be lowered as shown in FIG. 7 by the end portion of the lifting arm 48 to its lowered position onto the "loop" fabric 34 on the deck 12. Displacement of the lifting arms 42 is effected by rotation of the jack-screw 52 by the motor 54. The jack-screw 52 is accordingly threadedly received within a nut element 76 rotatably mounted within the rear-end portion 50 of the lifting arm 42, as shown in FIG. 5. Thus, rotation of the jack-screw 52 causes tangential displacement of the end portion 50 of the lifting arm 42 along the screw axis toward its upper end, accommodated by rotation of the motor 54 and pivotal displacement of the lifting arm 42 as shown in FIG. 7.

The separator units 20 as hereinbefore described separate "hook" fabric 83 on the undersurface of the skid pads 74 from the "loop" fabric 34 on the flight deck 12. A hydraulic piston cylinder 80 as shown in FIG. 2, moves a slide block 78 by means of piston rod 82. The separator blade 38 is affixed to the block 78 and is thereby slidably extended from a notch in the beam 16.

Based on the foregoing description, it will be apparent how the present invention is utilized for handling helicopter landing by contact of the loop fabric 34 on the flight deck 12 with the hook fabric 83 on the undersurface of the helicopter landing skid pads 74. After the helicopter 72 has landed, the shuttle frame 14 is maneuvered to a position on the deck 12 through the extended wheel assemblies 22 under steerage control from the hydraulic platform 32 so as to position the lifting arms 42 in underlying relation to the lift lugs 68 on the helicopter landing undercarriage 70. The wheel assemblies 22 are retractable and the lifting arms 42 are then raised to the positions shown in FIG. 6 to lift and support the helicopter weight. The separator blades 38 are then extended between the hook and loop fabrics 83 and 34 to separate then. The wheel assemblies 22 are then lowered, lifting the helicopter 72 off the deck 12. The skid blades 38 are then retracted as shown in FIG. 6 and the lifting arms 42 are lowered to release the lift lugs 68 and thereby deposit the helicopter 72 onto the deck 12. Deck locational changes may thereafter be made by shuttling of the frame 14 after sequential extension of the wheel assemblies 22 and the lifting arms 42, with the separator blades 38 retracted.

Obviously, other modifications and variations of the present invention may be possible in light of the foregoing teachings. It is therefore to be understood that within the scope of the appended claims the invention may be practiced otherwise than as specifically described.

What is claimed is:

1. For use in handling a helicopter landed on a flight deck of a marine vessel, said helicopter having an undercarriage with lift lugs thereon above skid pads adapted to contact the flight deck; a handling device comprising: a shuttle frame; a plurality of separator units mounted on and in underlying relation to the shuttle frame; retractable wheel means mounted on the shuttle frame for movement thereof between locations on the flight deck; and selectively controlled lift means mounted on said separator units and engageable with the lift lugs for raising the landed helicopter off the flight deck at said locations; each of said separator units including blade means for displacement between retracted positions and extended positions underlying the skid pads of the landed helicopter to separate the skid pads from the flight deck.

2. The handling device as defined in claim 1, wherein said shuttle frame has corner portions at which the separator units are attached thereto.

3. The handling device as defined in claim 2, wherein each of said separator units includes: a foundation pad attached to the shuttle frame; and said lift means including: a lift arm pivotally mounted on the foundation pad; and motor operated means operatively connected to the lift arm for displacement thereof from a lowered position to a raised position engaging the lift lug on the undercarriage of the landed helicopter.

4. The handling device as defined in claim 1, wherein each of said separator units includes: a foundation pad attached to the shuttle frame; and said lift means includes: a lift arm pivotally mounted on the foundation pad; and motor operated means operatively connected to the lift arm for displacement thereof from a lowered position to a raised position engaging the lift lug on the undercarriage of the landed helicopter.

5. The handling device as defined in claim 1, wherein each of said separator units includes: a foundation pad attached to the shuttle frame; and said blade means includes: a skid blade slidably mounted in underlying relation to the foundation pad from which the blade projects in the extended position.

6. For use in handling aircraft having landing pads outfitted with hook fabric adapted to contact loop fabric on a flight deck of a marine vessel when landing thereon; a handling system comprising: a shuttle frame; separator skid means attached to the shuttle frame for separation of the hook and loop fabrics upon landing on the flight deck; retractable wheel means mounted on the shuttle frame for movement thereof between locations on the flight deck; and lift means mounted on the separator skid means for lifting and transporting the landed aircraft on the shuttle frame from one of said locations on the flight deck to another of said locations at which the landed aircraft is securely held by the hook and loop fabrics.

7. The combination as defined in claim 6, wherein said separator skid means includes: a foundation pad attached to the shuttle frame; a slidably displaceable blade mounted in underlying relation on the foundation pad; and selectively controlled drive means connected to the blade for displacement thereof to an extended position underlying of the landed aircraft.

8. The combination as defined in claim 7, wherein the loop fabric on the flight deck establishes a surface layer disposed thereon extending between said locations in sliding contact with the blade.

* * * * *